US008769575B2

(12) United States Patent
Sung

(10) Patent No.: US 8,769,575 B2
(45) Date of Patent: Jul. 1, 2014

(54) METHOD OF PROVIDING USER INTERFACE IN DATA BROADCASTING RECEIVER

(75) Inventor: Woongdae Sung, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 1381 days.

(21) Appl. No.: 11/967,649

(22) Filed: Dec. 31, 2007

(65) Prior Publication Data

US 2008/0216118 A1 Sep. 4, 2008

(30) Foreign Application Priority Data

Feb. 8, 2007 (KR) .................. 10-2007-0013019

(51) Int. Cl.
| | |
|---|---|
| H04N 5/445 | (2011.01) |
| G06F 13/00 | (2006.01) |
| G06F 3/00 | (2006.01) |
| H04N 21/232 | (2011.01) |
| H04N 21/482 | (2011.01) |
| H04N 21/8549 | (2011.01) |

(52) U.S. Cl.
CPC ......... *H04N 21/232* (2013.01); *H04N 21/4828* (2013.01); *H04N 21/8549* (2013.01)
USPC ............... 725/40; 725/43; 725/44; 725/46; 725/47; 725/53; 715/721

(58) Field of Classification Search
CPC ............ H04N 21/8549; H04N 21/232; H04N 21/4828
See application file for complete search history.

(56) References Cited

U.S. PATENT DOCUMENTS

| | | | | |
|---|---|---|---|---|
| 6,282,713 | B1 * | 8/2001 | Kitsukawa et al. | 725/36 |
| 6,792,615 | B1 * | 9/2004 | Rowe et al. | 725/37 |
| 2002/0067376 | A1 * | 6/2002 | Martin et al. | 345/810 |
| 2002/0180774 | A1 * | 12/2002 | Errico et al. | 345/721 |
| 2003/0177503 | A1 * | 9/2003 | Sull et al. | 725/112 |
| 2005/0091165 | A1 * | 4/2005 | Sezan et al. | 705/52 |

FOREIGN PATENT DOCUMENTS

EP 1 094 409 4/2001

OTHER PUBLICATIONS

European Search Report dated Dec. 14, 2010.
Seno H et al: "Multimedia information broadcasting service Present", Vehicle Navigation and Information Systems Conference, 1994. Proceedin GS., 1994 Yokohama, Japan Aug. 31-Sep. 2, 1994, New York, NY, USA, IEEE, Aug. 31, 1994, pp. 117-120, XP010136588, DOI: DOI: 10.1109/VNIS.1994.396855 ISBN: 978-0/7803-2105-2 *Section 2 Outline of Present Section 3 Features of Present*.

(Continued)

*Primary Examiner* — Nathan Flynn
*Assistant Examiner* — James R Marandi
(74) *Attorney, Agent, or Firm* — Ked & Associates, LLP

(57) ABSTRACT

A method of providing a user interface in a data broadcasting receiver is provided. The method of providing a user interface in a data broadcasting receiver comprises selecting one of a plurality of search factor information transmitted together with video information through data broadcasting and displaying selection options for selecting one of a plurality of video information comprising a part of the video information corresponding to the selected search factor. Therefore, the user can simply search for various information while viewing a movie, a TV program, a sports, etc provided through data broadcasting.

9 Claims, 13 Drawing Sheets

(56) References Cited

OTHER PUBLICATIONS

Cosmas J et al: CustomTV system and demonstration:, Multimedia Computing and Systems, 1999. IEEE International Conference on Florence, Italy Jun. 7-11, 1999, Los Alamitos, CA, USA, IEEE Comput. Soc, US, vol. 2, Jun. 7, 1999, pp. 1110-1113, XP010519576, DOI: DOI:10.1109/MMCS. 1999.778673 ISBN: 978-0/7695-0253-3 *the whole document*.

Cooper R L W et al: A user interface for multichannel television:, Broadcasting Convention, 1995. IBC 95., International Amsterdam, Netherlands, London, UK, IEE, UK, Jan. 1, 1995, pp. 338-345, XP006528949, ISBN: 978-0-85296-644-0 *Section "EPG Delivery mechanism"; the whole document*.

Kruger B: "EPG as crystallization core for free-TV and new markets", 19980116, Jan. 16, 1998, pp. 3/1-314, XP006506760 *the whole document*.

Karpouzis et al: "MPEG-21 digital items to support integration of heterogeneous multimedia content", Computer Communications, Elsevier Science Publishers BV, Amsterdam, NL LNKD-DOI:10.1016/J. Comcom.2005.11.019, vol. 30, No. 3, Jan. 14, 2007, pp. 592-607, XP005830597, ISSN: 0140-3664 *Section 3—"MPEG-4 rich media generation" Section 4—"Digital Items in the proposed framework and implementation of the MPEG-21 standard" figure 10*.

European Office Action issued in related Application No. 07 150 476.5 dated Oct. 28, 2013.

* cited by examiner

Fig. 3

Example) major portion of XML schema (Movie or TV program)

```
<complexType name="program information table"±/>
  <sequence>
    <element name="production country"± type=¡°string¡± minOccurs=¡°0¡± maxOccurs=¡°unbounded¡±/>
      <complexType>
        <sequence>
          <element name="program" minOccurs=¡°0¡± maxOccurs=¡°unbounded¡±>
            <complexType>
              <sequence>
                <element name="title" type=¡°string¡± minOccurs=¡°0¡±/>
                <element name="director" type=¡°string¡± minOccurs=¡°0¡± maxOccurs=¡°unbounded¡±/>
                  <complexType>
                    <sequence>
                      <element name="list of works" type=¡°string¡± minOccurs=¡°0¡± maxOccurs=¡°unbounded¡±/>
                        <complexType>
                          <sequence>
                            <element name="channel" type=¡°string¡± minOccurs=¡°0¡±/>
                            <element name="production company" type=¡°string¡± minOccurs=¡°0¡±/>
                            <element name="photographing location" type=¡°string¡± minOccurs=¡°0¡±
maxOccurs="unbounded"/>
                          </sequence>
                        </complexType>
                      <element name="prizewinning history" type=¡°string¡± minOccurs=¡°0¡± maxOccurs=¡°unbounded¡±/>
                    </sequence>
                  </complexType>
                <element name="casting" type=¡°string¡± minOccurs=¡°0¡± maxOccurs=¡°unbounded¡±/>
                  <complexType>
                    <sequence>
                      <element name="list of works" type=¡±string¡± minOccurs=¡°0¡±
maxOccurs="unbounded"/>
                        <complexType>
                          <sequence>
                            <element name="channel" type=¡°string¡± minOccurs=¡°0¡±/>
                            <element name="production company" type=¡°string¡± minOccurs=¡°0¡±/>
                            <element name="photographing location" type=¡°string¡± minOccurs=¡°0¡±
maxOccurs="unbounded"/>
                          </sequence>
                        </complexType>
                      <element name="prizewinning history" type=¡°string¡± minOccurs=¡°0¡± maxOccurs=¡°unbounded¡±/>
                    </sequence>
                  </complexType>
                <element name="synopsis" type=¡°string¡± minOccurs=¡°0¡± maxOccurs=¡°unbounded¡±/>
                <element name="broadcasting time" type=¡°tva:TVATimeType¡± minOccurs=¡°0¡±/>
              </sequence>
              <attribute name="program identifier" type=¡±tva:CRIDType¡± use=¡°required¡±/>
            </complexType>
          </element>
        </sequence>
      </complexType>
    </element>
  </sequence>
</complexType>
```

Fig. 4

Example) XML document (Movie or TV program)

```
<genre>drama</genre>
  <country>Korea</country>
    <program>
      <title>Jumong</title>
      <director>LEE Juhwan</director>
        <list of works>----</list of works>
          <channel>----</channel>
          <production company>-----</production company>
          <photographing location>-----</photographing location>
        <list of works>----</list of works>
          <channel>----</channel>
          <production company>-----</production company>
          <photographing location>-----</photographing location>
        <prizewinning history>
      <casting>SONG Ilguk</casting>
        <list of works>----</list of works>
          <channel>----</channel>
          <production company>-----</production company>
          <photographing location>-----</photographing location>
        <list of works>----</list of works>
          <channel>----</channel>
          <production company>-----</production company>
          <photographing location>-----</photographing location>
        <prizewinning history>
      <casting> HAN Heyjin</casting>
        <list of works>----</list of works>
          <channel>----</channel>
          <production company>-----</production company>
          <photographing location>-----</photographing location>
        <list of works>----</list of works>
          <channel>----</channel>
          <production company>-----</production company>
          <photographing location>-----</photographing location>
        <prizewinning history>
      <synopsis>Major content is national foundation process of Kokuryo from birth of Jumong as life story of Jumong, which is national foundation myth of Kokuryo</synopsis>
        <broadcasting time>10 PM to 11 PM, November 6, 2006</broadcasting time>
      <program identifier>mbc.com/drama</program identifier>
```

Fig. 5

Example) Major portion of XML schema (Movie highlight)

```
<complexType name="hightlights/>
  <sequence>
    <element name="ProgramRef" type="tva:CRIDRefType"/>
    <element name="GroupType" type="tva:BaseSegmentGroupTypeType" maxOccurs="unbounded"/>
    <element name="Description" type="tva:BasicSegmentDescriptionType" minOccurs="0"/>
    <choice minOccurs="0">
      <element name="Segments" type="tva:SegmentsType"/>
      <element name="Groups" type="tva:GroupsType"/>
    </choice>
    <element name="KeyFrameLocator" type="TVAMediaTimeType"/ minOccurs="0" maxOccurs="unbounded"/>
  </sequence>
  <attribute name="groupId" type="tva:TVAIDType" use="required"/>
  <attribute name="duration" type="mpeg7:mediaDurationType"/>
```

Example) XML document (highlights of scene in which Jumong appears)

```
<SegmentGroupInformation groupId="12345">
  <ProgramRef crid="crid://mbc.com/drama/Jumong"/>
  <GroupType>highlights/objects</GroupType>
  <Description>
    <Title>Jumong</Title>
    <Synopsis>Scene in which Jumong appears</Synopsis>
    <CreditsList>SONG Ilguk</CreditsList>
    <Segments refList="67890 13579 24680"/>
    <mediaDuration>PT30M</mediaDurationduration>
```

Example) XML document (highlights of scene in which Jumong and Prince Daeso appear)

```
<SegmentGroupInformation groupId="54321">
  <ProgramRef crid="crid://mbc.com/drama/Jumong"/>
  <GroupType>highlights/objects</GroupType>
  <Description>
    <Title>Jumong and Prince Daeso</Title>
    <Synopsis>Scene in which Jumong and Prince Daeso appear</Synopsis>
    <CreditsList>SONG Ilguk</CreditsList>
    <CreditsList>KIM Seungsu</CreditsList>
    <Groups refList="12345 13254"/>
    <mediaDuration>PT40M</mediaDurationduration>
```

Fig. 6

Example) Major portion of XML schema (Sports)

```
<complexType name="¡°SportsInformation Table>
  <sequence>
    <element name="soccer"/>
      <complexType>
        <sqeuence>
          <element name="team name" type="¡°string¡± minOccurs="¡°0¡± maxOccurs="¡°2¡±/>
            <complexType>
              <sequence>
                <element name="name of league to which team belongs" type="¡°string¡± minOccurs="¡°0¡± use="optional"/>
                <element name="game time of league to which team belongs" type="¡°tva:TVATimeType¡± minOccurs="¡°0¡± use="optional"/>
                <element name="name of participating contest cup " type="¡°string¡± minOccurs="¡°0¡± use="¡°optional/>
                <element name="game time of participating game" type="¡°tva:TVATimeType¡± minOccurs="¡°0¡± use="optional"/>
                <element name="coach" type="¡°string¡± minOccurs="¡°0¡±>
                  <complexType>
                    <sequence>
                      <element name="major career" minOccurs="¡°0¡± maxOccurs="¡°unbounded¡±/>
                    </sequence>
                  </complexType>
                </element>
                <element name="player" maxOccurs="¡°unbounded¡±/>
                  <complexType>
                    <sequence>
                      <element name="major career" minOccurs="¡°0¡± maxOccurs="¡°unbounded¡±/>
                    </sequence>
                  </complexType>
                </element>
              </sequence>
            </complexType>
          </element>
        </sequence>
      </complexType>
    <attribute name="game identifier" type="¡°tva:CRIDType¡± use="¡°required¡±/>
    <attribute name="score" use="¡°optional¡±/>
  </sequence>
</complexType>
</element>
```

Fig. 7

Example) XML document (Sports)

```
<sports>
  <soccer>
    <team name> Manchester united </team name>
      <league to which team belongs>premier league</league to which team belongs>
      <game time>November 13, 2006</game time>
      <coach>-----</coach>
        <major career>-----</major career>
      <player>-----</player>
        <major career>-----</major career>
    <player>-----</player>
        <major career>-----</major career>
    <player>-----</player>
        <major career>-----</major career>
        ii
    <team name>Chelsea</team name>
      <league to which team belongs>premier league</league to which team belongs>
      <game time>November 13, 2006</game time>
      <coach>-----</coach>
        <major career>-----</major career>
      <player>-----</player>
        <major career>-----</major career>
    <player>-----</player>
        <major career>-----</major career>
    <player>-----</player>
        <major career>-----</major career>
        ii
    <game identifier> premierleague.com/Manchester united_Chelsea </game identifier>
```

Fig. 8

Example) XML document (goal scene in match between Manchester United and Chelsea)

```
<SegmentGroupInformation groupId=¡°12345¡±>
  <ProgramRef crid=¡°crid://sport.com/football/primier league/manchesterunited-chellcy¡±/>
  <GroupType>highlights/events</GroupType>
  <Description>
    <Title>Match Hightlights 1</Title>
    <Synopsis>Goals from the match</Synopsis>
    <Goal players>First Goal-ABC/manchesterunited</Goal players>
    <Goal players>Second Goal-DEF/chellcy</Goal players>
    ¡¦
    <Segments refList=¡°67890 13579 24680¡±/>
    <mediaDuration>PT2M</mediaDurationduration>
```

Example) XML document (shooting scene in match between Manchester United and Chelsea)

```
<SegmentGroupInformation groupId=¡°54321¡±>
  <ProgramRef crid=¡°crid://sport.com/football/primier league/manchesterunited-chellcy¡±/>
  <GroupType>highlights/events</GroupType>
  <Description>
    <Title>Match Hightlights 2</Title>
    <Synopsis>Shootings from the match</Synopsis>
    <Shooting players>First-HIJ/chellcy</Shooting players>
    <Shooting players>Second-ABC/menchesterunited</Shooting players>
    ¡¦
    <Segments refList=¡°12345 13254¡±/>
    <mediaDuration>PT10M</mediaDurationduration>
```

Fig. 10
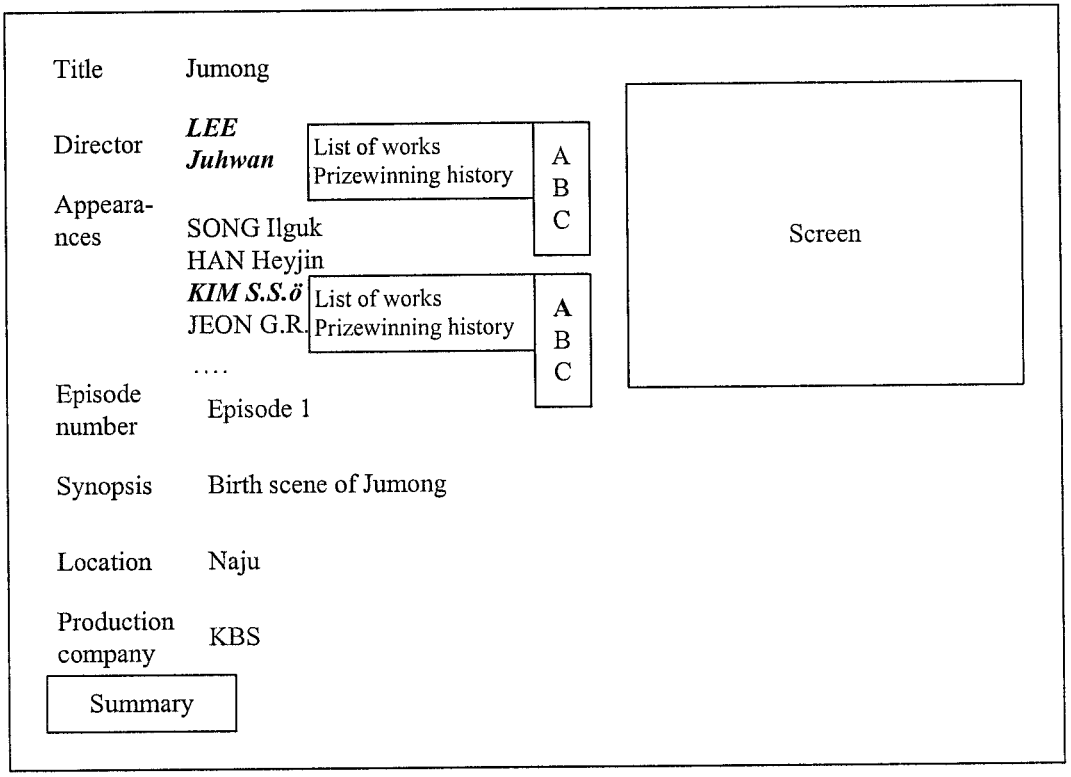
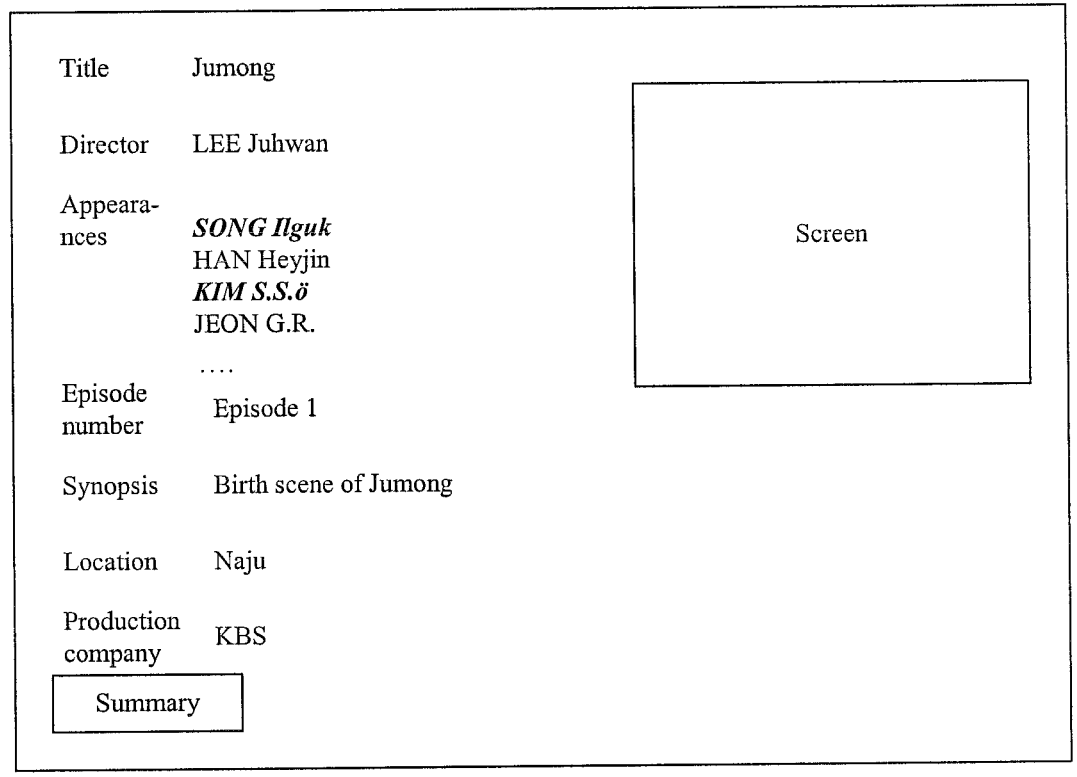

Fig. 11

| | |
|---|---|
| Title | Jumong |
| Director | LEE Juhwan |
| Appearances | *SONG Ilguk*<br>HAN Heyjin<br>*KIM S.S.ö*<br>JEON G.R.<br>.... |
| Episode number | Episode 1 |
| Synopsis | Birth scene of Jumong |
| Location | Naju |
| Production company | KBS |

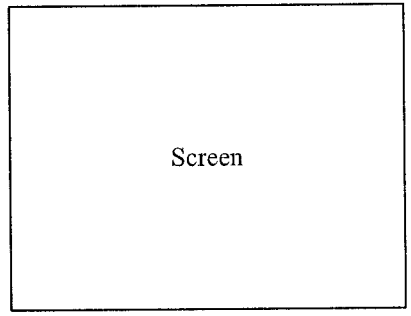

Screen

[ Summary ] [ 30 minutes ] [ 20 minutes ] [ 10 minutes ]

---

| | |
|---|---|
| Title | Jumong |
| Director | LEE Juhwan |
| Appearances | *SONG Ilguk*<br>HAN Heyjin<br>KIM S.S.ö<br>JEON G.R.<br>.... |
| Episode number | Episode 1 |
| Synopsis | Birth scene of Jumong |
| Location | Naju |
| Production company | KBS |

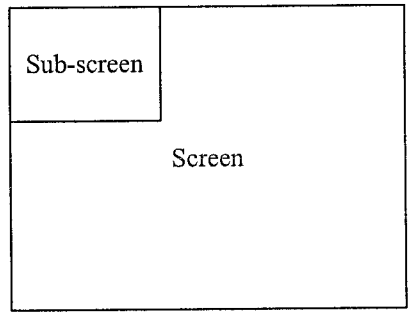

Sub-screen

Screen

[ Summary ] [ 30 minutes ] [ 20 minutes ] [ 10 minutes ]

Fig. 13
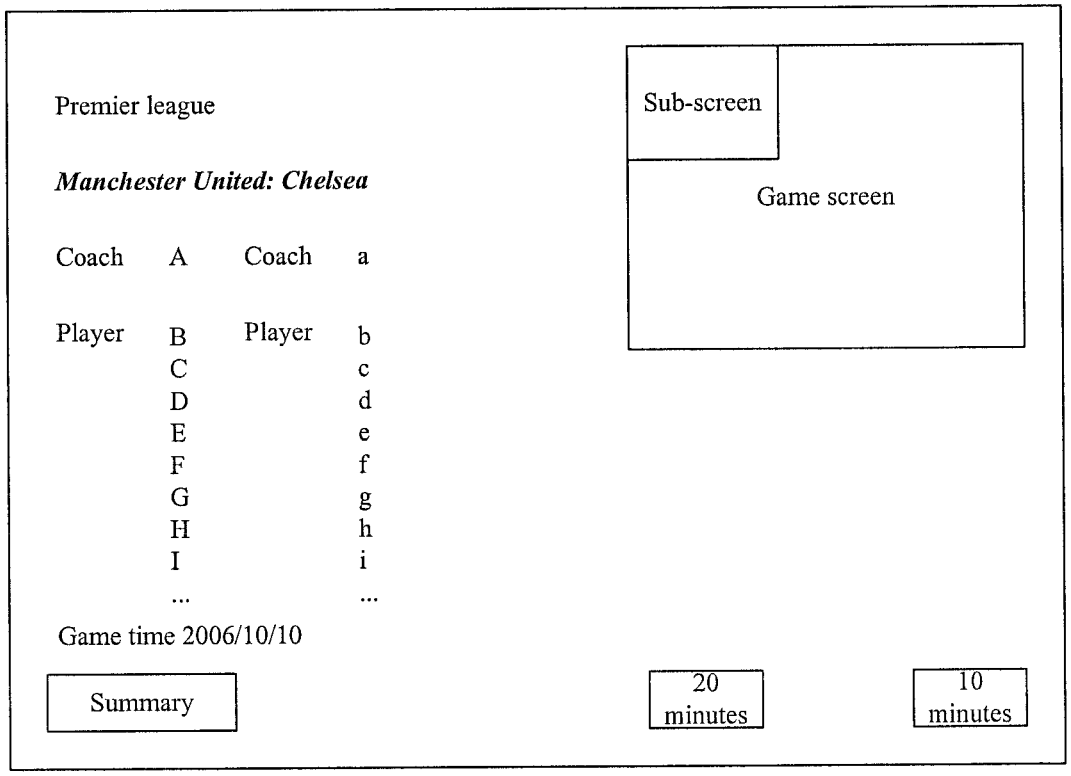
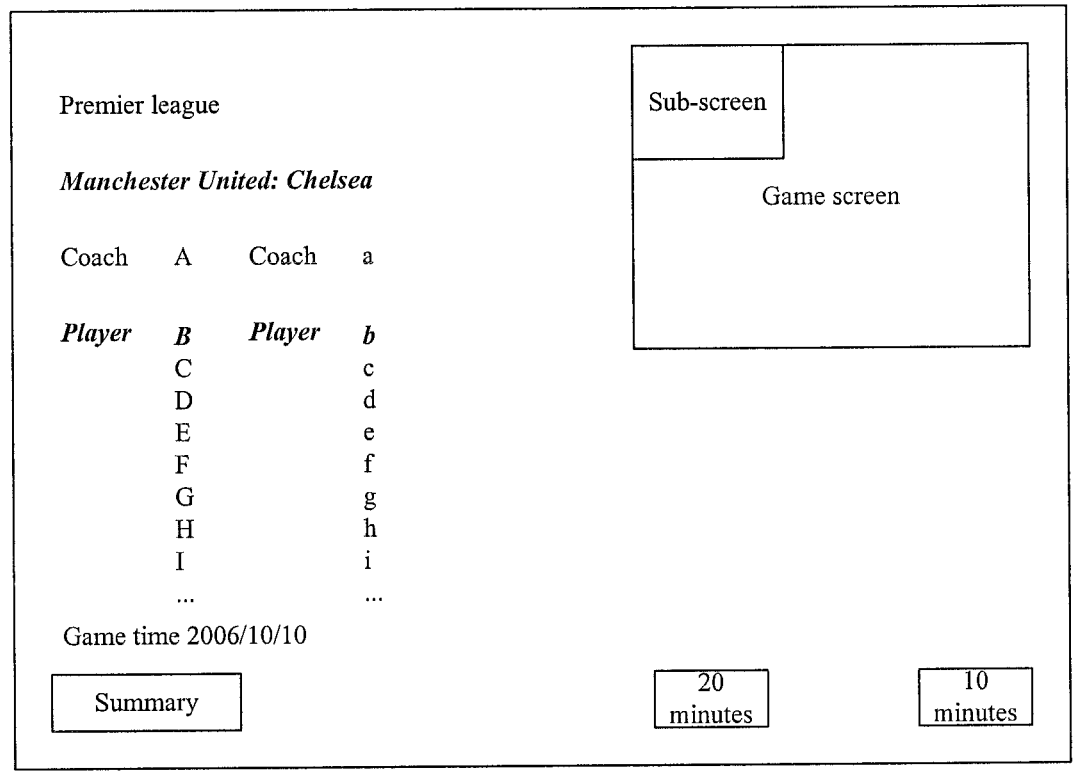

METHOD OF PROVIDING USER INTERFACE IN DATA BROADCASTING RECEIVER

This application claims priority under 35 U.S.C. §119(a) on patent application No. 10-2007-0013019 filed in Republic of Korea on Feb. 8, 2007 the entire contents of which are hereby incorporated by reference.

BACKGROUND

1. Field

This document relates to a method of providing a user interface in a data broadcasting receiver.

2. Related Art

Nowadays, data broadcasting for providing a Java application as well as audio and video with a broadcasting stream of a binary data format through a digital broadcasting electric wave has been executed.

When a data broadcasting receiver such as a digital television (D-TV) or a set-top box (STB) receives the data broadcasting stream, the data broadcasting receiver performs a buffering operation of temporarily storing the data broadcasting stream within a buffer memory such as a SDRAM.

The data broadcasting receiver decodes and signal-processes data buffered in the buffer memory and outputs the data to audio, video, and a text. Because a general data broadcasting receiver does not separately provide a user interface function in which a user selects and checks information related to a wanted actor or player while viewing various broadcasting programs such as a movie or sports received through data broadcasting, a method of efficiently providing the user interface function is requested.

SUMMARY

An aspect of this document is to provide a user interface that can simply check information requested by a user in a broadcasting program displayed on a screen of a data broadcasting receiver for receiving and outputting data broadcasting.

In one general aspect, a method of providing a user interface in a data broadcasting receiver comprises: selecting one of a plurality of search factor information transmitted together with video information through data broadcasting; and displaying an selection option for selecting one of a plurality of video information comprising a part of the video information corresponding to the selected search factor.

The video information may be a video stream.

The plurality of video information comprising a part of the video information may be a summary stream of the video stream.

The plurality of search factor information may be formed with a software application.

The software application may be a Java application, a Hypertext Markup Language (HTML) application, or an Extensible Markup Language (XML) application.

The plurality of search factor information may be information about an object comprised in the video information.

The information about the object may comprise a name of a character appeared in the video information, a name of a director produced the video information, information describing a specific event comprised in the video information, a team name of a sports game, or meta data.

The selection option may comprise a combination of the plurality of search factor information or time information.

The time information may be a game time of the video information.

The time information or the combination of the plurality of search factor information corresponding to the plurality of search factor information may be formed with an XML application.

The summary stream may be a summary stream comprising a character comprised in the video information, a summary stream comprising a specific event comprised in the video information, or a highlight of a sports game comprised in the video information.

The displaying of a selection option may comprise selecting a plurality of video information comprising a part of the video information.

BRIEF DESCRIPTION OF THE DRAWINGS

The details of one or more implementations are set forth in the accompanying drawings and the description below. In the entire description of this document, like reference numerals represent corresponding parts throughout various figures.

FIGS. 3 to 8 are diagrams illustrating XML documents received in a data broadcasting receiver through data broadcasting in implementations; and FIGS. 9 to 13 illustrate screens displayed in a data broadcasting receiver in implementations.

DETAILED DESCRIPTION

Hereinafter, a method of providing a user interface in a data broadcasting receiver in an implementation will be described in detail with reference to the accompanying drawings.

Figure 1:
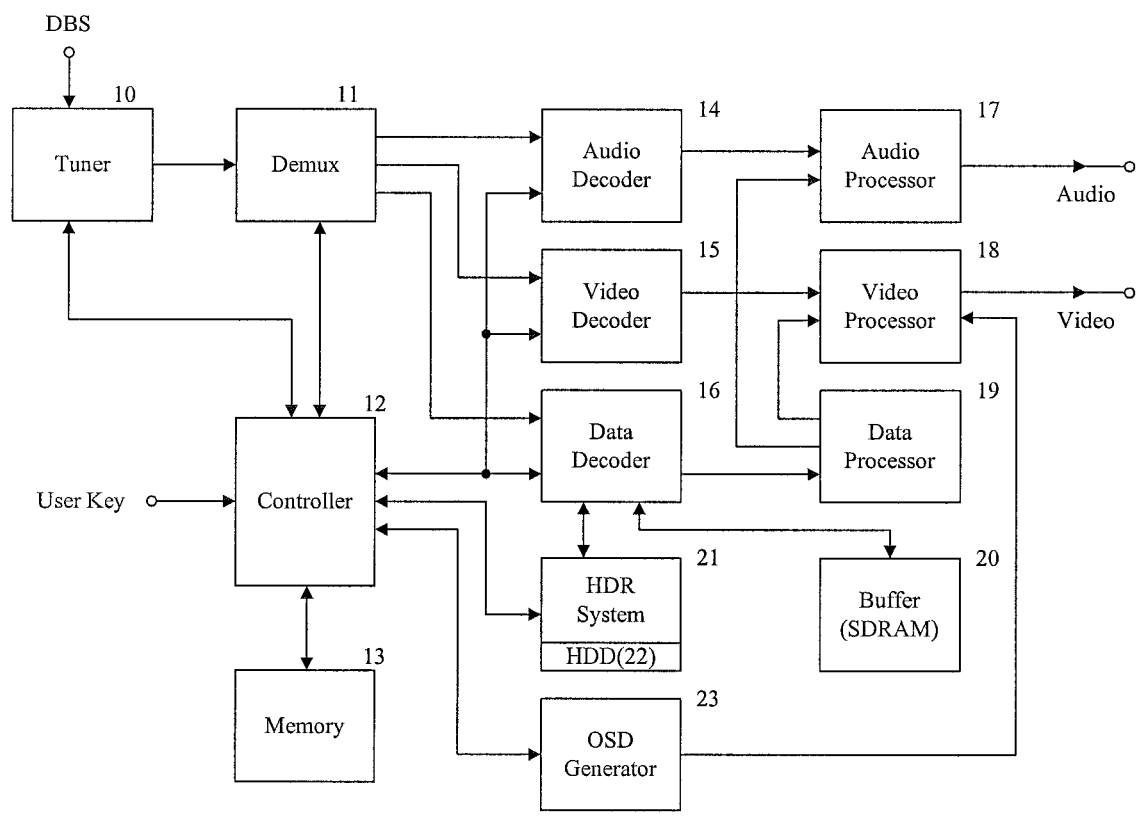
FIG. 1 is a block diagram illustrating a configuration of a data broadcasting receiver for applying a method of providing a user interface in an implementation.

FIG. 1 is a block diagram illustrating a configuration of a data broadcasting receiver for applying a method of providing a user interface in an implementation. The data broadcasting receiver such as a digital television (D-TV) or a set-top box (STB) may comprise a tuner 10, a demux 11, a controller 12, a memory 13, an audio decoder 14, a video decoder 15, a data decoder 16, an audio processor 17, a video processor 18, a data processor 19, a buffer memory 20, a hard disk drive recorder (HDR) system 21, a hard disk (HDD) 22, and an OSD generator 23.

When a broadcasting channel is selected by key input of a user, the controller 12 controls the tuner 10 to select a corresponding broadcasting channel, and the demux 11 checks packet ID (PID) included in a header of a transmission packet of a broadcasting data stream, for example an MPEG transport stream received through the tuner 10.

Referring to the checked packet ID, audio data included in a payload of the transmission packet are output to the audio decoder 14 and video data are output to the video decoder 15, and if a currently selected broadcasting channel is for example a data broadcasting channel, the demux 11 outputs data of a data broadcasting stream to the data decoder 16 with reference to the packet ID included in a header of the transmission packet.

The data decoder 16 buffers the data in the buffer memory 20, and the buffer memory 20 may use a SDRAM having a size of for example 32 or 64 MB. When a predetermined amount of data are buffered within the buffer memory 20, the data decoder 16 reads and decodes the buffered data.

The decoded data are processed to data that can be displayed by the data processor 19 or data that can be output as audio and are output to the video processor 18 or the audio processor 17 or are output together with video data output from the video processor 18 or audio data output from the audio processor 17.

The controller 12 controls the data processor 19 to process a Java application, a HTML application, an XML application, or an application to which the applications are coupled and to output various menu screens including such as a text or a user selection icon. Therefore, the user can view audio and video whose signal is processed by an audio processor and a video processor and view various menu screens processed by the data processor.

Figure 2:
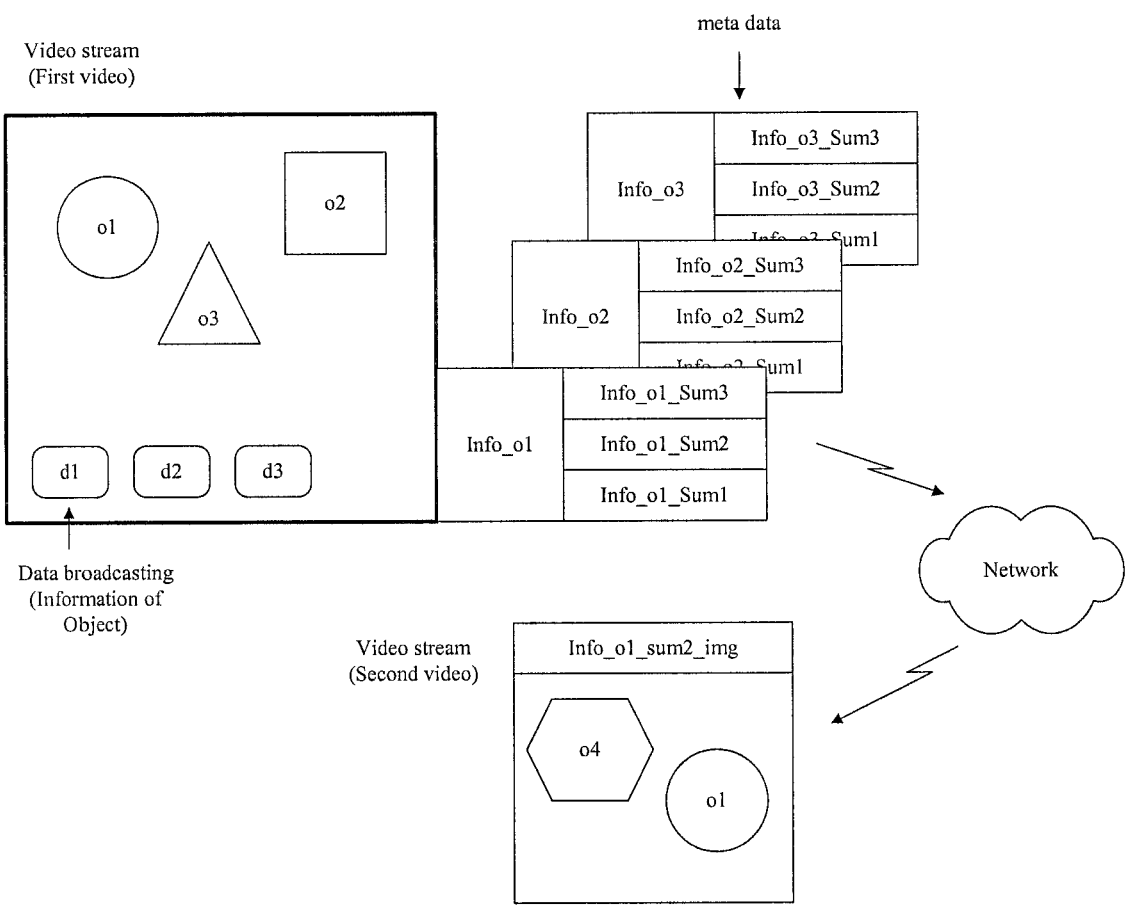
FIG. 2 is a diagram schematically illustrating a method of providing a user interface in an implementation.

When a data broadcasting stream of for example a JAVA application, a HTML application, an XML application or an application to which the applications are coupled and various software applications comprising any moving picture file or any still picture file is received, the data broadcasting receiver displays a plurality of search factors (d1, d2, d3) transmitted together with first video information of a video stream differently from each of objects (o1, o2, o3), as shown in FIG. 2.

When one search factor d1 of the plurality of search factors is selected, the data broadcasting receiver displays a selection option (Info_olsum1, Info_olsum2, Info_olsum3, etc.) for selecting one of a plurality of videos (sum1, 2, 3) comprising at least an object o1 corresponding to the selected search factor d1. The selection option can be generated using information included in an XML application corresponding to the selected search factor, and the XML application can provide time information or a combination of the plurality of search factor information.

Further, the time information or the combination of the plurality of search factor information may become meta data based on a TV-Anytime standard.

When for example the second summary stream information (Info_o1_Sum2) among the selection options is selected, the data broadcasting receiver searches for and receives a second summary stream information image (Info_o1_Sum2_img) through a network and displays the second summary stream information image (Info_o1_Sum2_img) as a second video and for example, a fourth object o4 together with the first object o1 is displayed in the second video, as shown in FIG. 2.

The data broadcasting receiver receives data broadcasting interlocking with a program comprising a JAVA application, a HTML application, an XML application following a Digital Video Broadcasting Multimedia Home Platform (DVB-MHP) or an application to which the applications are coupled and any moving picture file or any still picture file, decodes the received TV program or sports game, and displays the decoded TV program or sports game on a screen. And, if a user selects a specific actor in a state in which a selection menu comprising data related to the screen is displayed together with the screen, the data broadcasting receiver searches for and summarizes a scene in which the actor is comprised, and displays the scene through a Picture In Picture (PIP). If the user selects a highlight of the sports game in the state, the data broadcasting receiver searches for only a highlight of the game, and displays the highlight in the PIP.

For example, FIG. 3 illustrates a major portion of an XML schema about a movie or a TV program. A program information table may comprise information such as a production country, a program, a title, a director, a list of works, a channel, a production company, a photographing location, a prizewinning history, a casting, a synopsis, a broadcasting time, and a program identifier, as shown in FIG. 3.

FIG. 4 illustrates an XML document prepared based on an XML schema about a movie or TV program shown in FIG. 3.

The broadcasting receiver in this document receives the XML document, and the received XML document may comprise a genre of a broadcasting program, a country, a title, a director, a list of works, a channel, a production a company, a photographing location, a prizewinning history, a casting, a synopsis, a broadcasting time, program identifier information.

FIG. 5 illustrates a major portion of an XML schema about a highlight of a movie or TV program, and the major portion comprises a 'ProgramRef' indicating a source program of the highlight, a 'GroupType' indicating a form of the highlight, 'Description' indicating description information of the highlight, 'Segments/Groups' indicating whether the highlight consists of a segment or a group, a 'KeyFrameLocator' indicating a position in a time order at which a 'KeyFrame' is positioned within the highlight, a 'duration' indicating a game time period of a highlight, and an 'identifier' for identifying the highlight.

Further, as shown in FIG. 5, an XML related to the highlight comprises information about a main character, a synopsis, list information of Segments or Groups to which the highlight belongs, and a game time period of the highlight, as description information about a highlight in which the main character appears.

FIG. 6 illustrates a major portion of an XML schema related to sports, and for example a sports information table may comprise information such as soccer, a team name, a name of a league to which the team belongs, game time of a league to which the team belongs, a name of a participating contest cup, a game time of a participating game, a coach, a major career, a player, a game identifier, and a score.

FIG. 7 illustrates an XML document prepared based on the XML schema shown in FIG. 6, and the XML document comprises a sports, a soccer, a team name, a league to which the team belongs, a game time of a league to which the team belongs, a coach, a major career, a player, and game identifier information.

FIG. 8 illustrates an XML document related to a highlight of a sports game, and the XML document comprises information about a player that kicked a goal in a specific team, information about a player that shot a ball, list information of Segments to which the highlight belongs, and a game time of the highlight.

Figure 9:
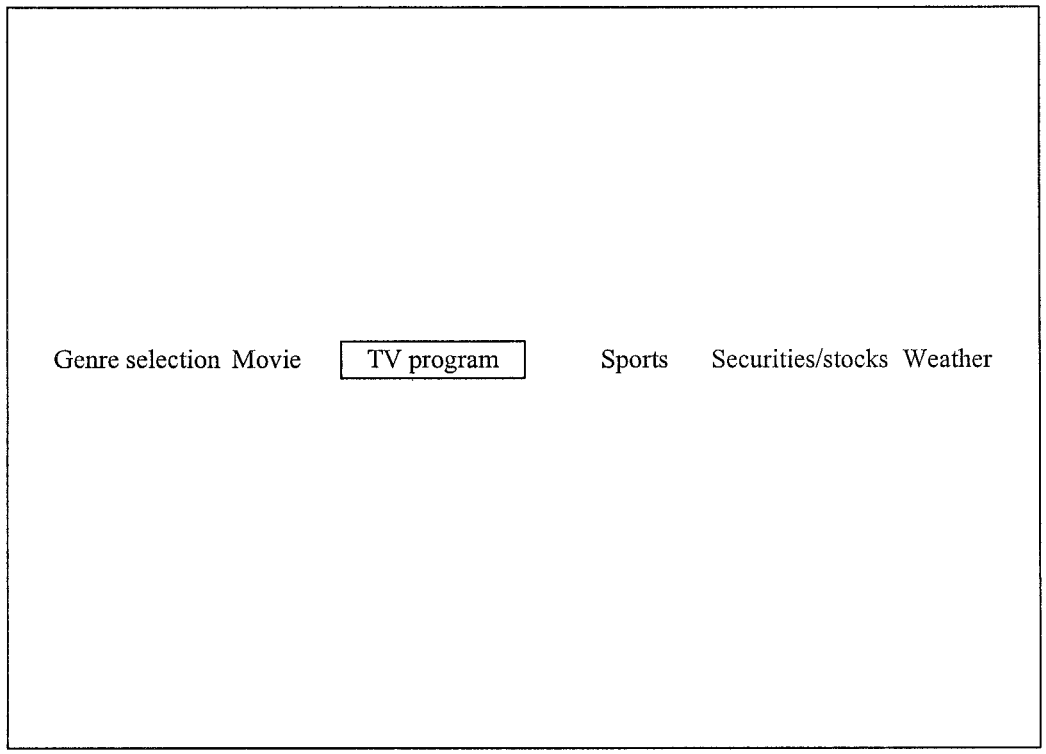

FIGS. 9 to 13 illustrate screens displayed in the data broadcasting receiver in implementations. Menu items such as genre selection, a movie, a TV program, a sports, securities/stocks, and weather are displayed on a menu screen for a user interface, as shown in FIG. 9.

When the TV program among the menu items is selected, the broadcasting receiver displays information about a country, a channel, a title, a director, a casting, an episode number, and a location. If for example an 'MBC' broadcasting station and a television serial drama 'Jumong' are selected, various information related to the drama provided through a Java application, an HTML application, an XML application or an application to which the applications are coupled as well as video data are displayed on a screen, as shown in FIG. 10. Here, information such as a country, a title, and an episode number can be scrolled and selected.

When a software application in this document is formed with a Java application or a HTML application, menu screens for user interfaces of FIGS. 10 and 11 and FIGS. 13 and 14 may be formed with a Java application or a HTML application, and when the software application is formed with a Java application and an XML application, the screen (for example, in FIG. 10, a menu screen comprising a user selection icon to distinguish an actor selected by a user from other actors or to distinguish a 'summary' from other items on a screen) in FIGS. 10 and 11 and FIGS. 13 and 14 may be formed with a Java application, and text data to be a content may be formed with a XML application. The XML application is shown in FIGS. 4 and 7.

In a director menu or an actor menu of FIG. 10, a title or a prizewinning history of a movie directed by the director may be displayed, or a title or a prizewinning history of a movie in which the actor appears may be displayed. When a synopsis is selected, an entire outline of episode 1 of the drama 'Jumong' and many small outlines into which an entire outline of the drama is divided are distinguishably displayed.

If actors 'Song Ilguk' and 'Kim Seungsu' from the actor menu are selected and a summary is selected, a menu for selecting a plurality of summary streams in which the actors 'Song Ilguk' and 'Kim Seungsu' appeared is displayed, as shown in FIG. 11. In FIG. 11, if the user selects one of a plurality of time items (30 minutes, 20 minutes, 10 minutes) displayed together with a summary item, the broadcasting receiver reads a segment group ID ('SegmentGroupInformation groupId' of FIG. 5) and a 'ProgramRef crid' of FIG. 5 from an XML application (meta data defined in a TV-Anytime standard) that has been already received, stored in the memory 13 (or a smart card), and corresponds to the selected time item, searches for position of a plurality of summary streams through a network, receives the summary stream from the found position, and displays the summary stream on a screen. The summary screen may be displayed as a PIP sub-screen within a screen.

When user preference viewing information is stored in the memory 12, if a plurality of time items is displayed, the broadcasting receiver can display '20 minutes' as the user preference viewing information differently from '30 minutes' and '10 minutes', as shown in FIG. 11.

Here, which segment will belong to a summary stream of a game time period '10 minutes', '20 minutes', or '30 minutes' can be determined according to time periods of segments in which two actors appear. That is, a segment level indicating which summary stream the segment belongs to can be determined based on a time period of the corresponding segment, and thus as a time period of the segment becomes long, a segment level becomes high.

For example, when the number of summary segments in which all of two actors appear is 30, a first summary segment group is determined by adding segments from a segment of which a time period is the longest until the time period becomes 10 minutes, a second summary segment group (a time period of 20 minutes) is determined by adding the first segment group to a summary segment group formed with the same method, and a third summary segment group (a time period of 30 minutes) is determined with the same method. In this case, the third summary segment group comprises the first and second summary segment groups, and the second summary segment group comprises the first summary segment group.

Further, a preference order (a preference order of an outline to which the corresponding segment belongs) given to a plurality of small outlines included in each episode (for example, episode 1) of the drama 'Jumong' and a segment game time period may become a reference for determining a segment level. For example, an entire stream of episode 1 of the drama 'Jumong' is divided into 2 streams according to small outlines and a preference order thereof is determined, and in consideration of the preference orders and the game time periods of respective segments, the first, second, and third summary segment groups can be determined. In this case, a game time period of the summary stream may be changed without being fixed to 10 minutes, 20 minutes, and 30 minutes.

Further, a method of determining at least two summary segment groups from several segments comprises searching for all segments in which a game time period in which two actors appear exceeds a predetermined time period, determining a first summary segment group by extracting data of an initial predetermined time period out of the found each segment, determining a second summary segment group by extracting data of a next predetermined time period after data extracted as the first summary segment group from the found each segment and aligning the extracted data and data included in the first summary segment group in a time order, and determining a third summary segment group by extracting data of a next predetermined time period after data extracted as the first summary segment group and the second summary segment group from the found each segment and aligning the extracted data and data included in the second summary segment group in a time order.

When one of small outlines and a specific actor are selected from a synopsis, a plurality of summary segment groups can be formed within a stream related to the selected small outline according to the above-described reference.

Figure 12:
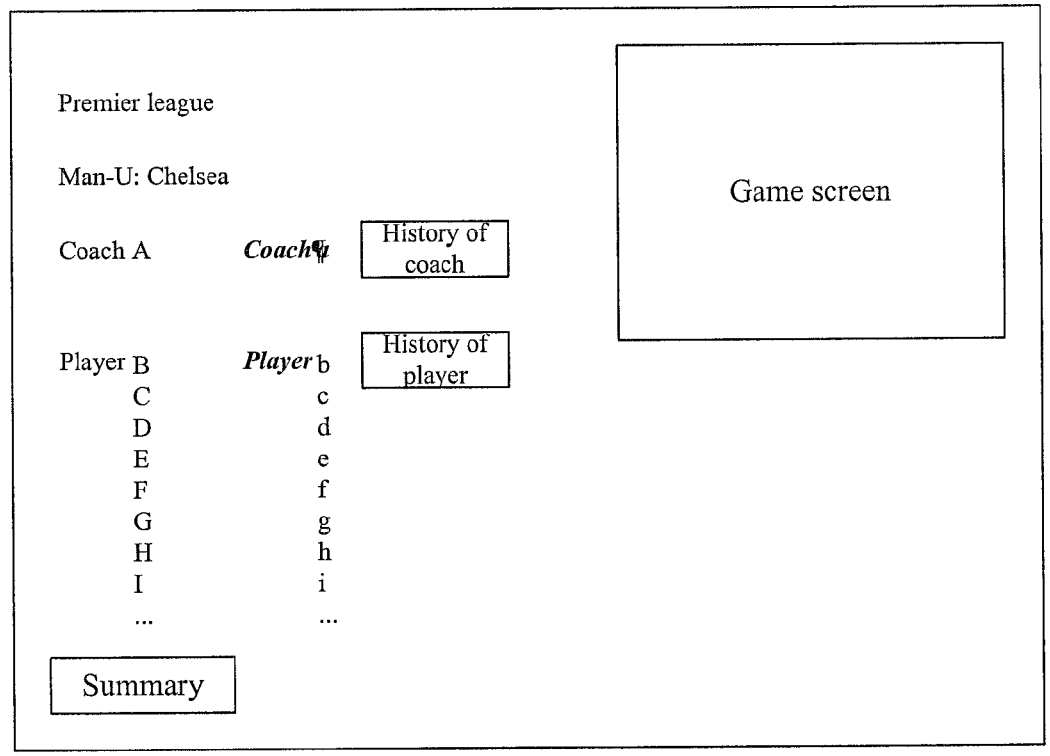

As shown in FIG. 12, when a sports among the menu items is selected, the broadcasting receiver displays information related to soccer, a channel, a league, a game, and a game schedule. If for example a premier league and a soccer game between Manchester united and Chelsea are selected, a game screen in which video data are played and various information related to the game prepared with a Java application, a HTML application, an XML application, or an application to which the applications are coupled are displayed, and in a coach menu or a player menu, a history of the coach or a history of the player may be displayed. A game can be selected by selecting a league or a team, and when a prior game is selected, a score may be displayed behind the league. Here, soccer, a league, a game, and a game schedule can be scrolled and selected.

In FIG. 12, when a summary is selected, a plurality of time items are displayed in order to select one of a plurality of summary streams, as shown in FIG. 13. If the user selects one of the plurality of time items displayed together with a summary item, the broadcasting receiver reads a segment group ID ("SegmentGroupInformation grouped" of FIG. 8) and a 'ProgramRef crid' of FIG. 8 from an XML application (meta data defined in a TV-Anytime standard) that has been already received, stored in the memory 13 (or a smart card), and corresponds to the corresponding time, searches for a position of a plurality of summary streams through a network, receives the summary stream from the found position, and displays the summary stream on the screen. Further, in a plurality of time items within the summary item, a 10 minute item may comprise only goal scenes and a 20 minute item may comprise goal scenes and shooting scenes.

When user preference viewing information is stored in the memory 12 and a plurality of time items are displayed, the broadcasting receiver may display the item of '10 minutes' as user preference viewing information differently from the item of '20 minutes.

When the user selects one of a plurality of time items (20 minutes and 10 minutes) displayed on a screen together with a summary item, the broadcasting receiver may receive the corresponding summary stream through a network and display the summary stream on a PIP sub-screen. Further, when the user selects for example a 10 minute summary, the broadcasting receiver may display names of players that kicked at least a goal in a goal order together with a game screen (for example, Manchester United: a player C—the first goal, a player D—the second goal, Chelsea: a player E—the first goal). And, when the user selects for example a 20 minute summary, the broadcasting receiver may display names of players that kicked at least a goal and names of players that shot a ball in a goal and shooting order together with a game screen (for example, goal: Manchester United: a player C—the first goal, a player D—the second goal, Chelsea: a player E—the first goal, and shooting: Manchester United: the player E, a player F, and a player G, Chelsea: a player H and a player I).

A method of this document can be applied to a data broadcasting receiver for receiving data broadcasting through a transmission path such as an Advanced Television Systems Committee (ATSC), Digital Video Broadcasting (DVB), Digital Multimedia Broadcasting (DMB), Digital Video Broadcasting—Handheld (DVB-H), MidiaFlo, and Internet Protocol Television (IPTV).

For reference, when data broadcasting is stored in storage medium such as the hard disk 22 using the HDR system 21 and is played by the user at a desired time, a method of this document can be used. In broadcasting environment, in order to embody a summary, segmented AV data may be separately sent and a bookmark may be set to AV data as XML data in storage media.

Therefore, the user can simply search for various information while viewing a movie, a TV program, a sports, etc provided through data broadcasting.

Other features will be apparent from the description and drawings, and from the claims.

What is claimed is:

1. A method of providing a user interface in a data broadcasting receiver, comprising:
    displaying at least one search factor information transmitted together with video information through broadcasting, wherein the at least one search factor information is associated with at least one object which is displayed in the video information;
    when one search factor information is selected from the displayed at least one search factor information, displaying selection options for selecting a duration for a summary stream including a plurality of scenes in which one object associated with the selected search factor information is displayed; and
    displaying the summary stream for the one object having the selected duration,
    wherein a summary stream for a first selection option that corresponds to a first duration includes additional scenes from the video information associated with the selected object than a summary stream for a second selection option that corresponds to a second duration, the first duration being greater than the second duration.

2. The method of claim 1, wherein the plurality of at least one search factor information is formed with a software application.

3. The method of claim 2, wherein the software application is a Java application.

4. The method of claim 2, wherein the software application is a HTML application.

5. The method of claim 1, wherein the search factor information associated with the at least one object comprises at least one of names of characters who appeared in the video information, a name of a director who produced the video information, a specific event included in the video information, or a team name of a team in a sporting event.

6. The method of claim 1, wherein the search factor information associated with the at least one object comprises meta data.

7. The method of claim 1, wherein the selection options comprise time information.

8. The method of claim 7 wherein the time info information comprises a game time of the video information.

9. The method of claim 1, wherein the video information is divided by the search factor information and time information.

* * * * *